United States Patent
Dagan et al.

(10) Patent No.: US 10,915,630 B2
(45) Date of Patent: *Feb. 9, 2021

(54) ANTI-SPOOFING DEFENSE SYSTEM FOR A CAN BUS

(71) Applicant: Ramot at Tel-Aviv University Ltd., Tel Aviv (IL)

(72) Inventors: Tsvika Dagan, Rishon LeZion (IL); Avishai Wool, Petah Tikva (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,535

(22) Filed: Jan. 30, 2020

(65) Prior Publication Data

US 2020/0226252 A1    Jul. 16, 2020

Related U.S. Application Data

(63) Continuation of application No. 15/654,740, filed on Jul. 20, 2017, now Pat. No. 10,599,840.

(60) Provisional application No. 62/364,899, filed on Jul. 21, 2016.

(51) Int. Cl.
*G06F 21/00* (2013.01)
*G06F 21/55* (2013.01)
*H04L 29/06* (2006.01)

(52) U.S. Cl.
CPC ............ *G06F 21/554* (2013.01); *G06F 21/55* (2013.01); *H04L 63/1458* (2013.01); *H04L 63/1466* (2013.01); *H04L 63/1483* (2013.01)

(58) Field of Classification Search
None
See application file for complete search history.

(56) References Cited

U.S. PATENT DOCUMENTS

2015/0172298 A1* 6/2015 Otsuka ................ H04L 63/123
 726/30
2017/0026198 A1* 1/2017 Ochiai .............. H04L 12/40039
2018/0181743 A1* 6/2018 Hofman ................ G06F 21/55

OTHER PUBLICATIONS

Authors: Tsutomu Matsumoto, Masato Hata, Masato Tanabe, Katsunari Yoshioka, Kazuomi Oishi; "A Method of Preventing Unauthorized Data Transmission in Controller Area Network"; Publisher: IEEE; Date: 2012; pp. 1-5 (Year: 2012).*

* cited by examiner

*Primary Examiner* — Andrew J Steinle
(74) *Attorney, Agent, or Firm* — Kligler & Associates Patent Attorneys Ltd

(57) ABSTRACT

A method includes identifying an impersonating message, transmitted over a Controller Area Network (CAN) bus by an attacking node connected to the bus, that appears to originate from a source other than the attacking node. The method further includes, in response to identifying the impersonating message, driving the attacking node into an error-passive state in which an ability of the attacking node to communicate over the bus is limited, relative to before entering the error-passive state. The method further includes, subsequently to driving the attacking node into the error-passive state, driving the attacking node into a bus-off state in which the attacking node cannot communicate over the bus, by transmitting, over the bus, a plurality of passive-error-flag-trumping messages that collide with, and trump, respective instances of a passive-error flag that the attacking node transmits over the bus. Other embodiments are also described.

20 Claims, 3 Drawing Sheets

ANTI-SPOOFING DEFENSE SYSTEM FOR A CAN BUS

CROSS-REFERENCE TO RELATED APPLICATIONS

The present application is a continuation of U.S. patent application Ser. No. 15/654,740, entitled "Anti-spoofing defense system for a CAN bus," filed Jul. 20, 2017 and published as US 2018/0025156, whose disclosure is incorporated herein by reference, which claims the benefit of U.S. Provisional Application 62/364,899, entitled "Anti-spoofing defense system for a CAN bus," filed Jul. 21, 2016, whose disclosure is incorporated herein by reference.

FIELD OF THE INVENTION

The present invention relates to the field of cybersecurity.

BACKGROUND

Modern vehicles have multiple dedicated computers called "electronic control units" (ECUs). These ECUs control various aspects of the vehicle's operation, e.g., by controlling the vehicle's engine, breaking and steering, and entertainment systems. The ECUs are connected to each other, over a bus, in a network that typically uses a version of the Controller Area Network (CAN) bus protocol. Version 2.0 of this protocol is described in a document entitled CAN Specification, version 2.0, published in 1991 by Robert Bosch GmbH, which is incorporated herein by reference. Another version of this protocol, CAN with Flexible Data-Rate (CAN FD), is described in a document entitled CAN with Flexible Data-Rate, Specification version 1.0, published in 2011 by Robert Bosch GmbH, which is incorporated herein by reference.

An ECU typically comprises a processor, such as a microcontroller, which is a programmed digital computing device typically comprising a central processing unit (CPU) and a random access memory (RAM). Typically, the processor runs firmware or software. An ECU typically further comprises a "CAN controller" and a "CAN transceiver," which collectively implement the CAN bus protocol and handle communication over the CAN bus. The CAN controller may be part of, or separate from, the processor.

Per the CAN bus protocol, the ECUs broadcast multi-bit messages (or "frames") over the bus. The CAN bus protocol is a synchronous protocol, in which time is split into bit-time slots. (For example, on a 1 Mbps network, each bit-time slot is 1 μs long.) During each bit-time slot, there can be only one bit value on the bus. Whenever two ECUs attempt to broadcast different bits during the same bit-time slot, a "collision" occurs. In such a situation, the dominant bit overwrites, or "trumps," the recessive bit, such that the dominant bit, rather than the recessive bit, is carried by the bus. The ECU that broadcasted the dominant bit may be said to have "won" the collision, while the other ECU may be said to have "lost" the collision.

In typical implementations, the CAN bus protocol designates the "zero" bit as dominant and the "one" bit as recessive; in other implementations, the reverse designation may be used. To help maintain synchronization, a bit stuffing is applied, whereby, after every five consecutive bits of the same value, a bit of the opposite value is inserted. (This bit stuffing is not applied to error messages or to some fixed-content fields such as the end-of-frame (EOF) field, each of which may include more than five consecutive bits of the same value, as further described below.)

Some messages, known as "data frames," include several fields. In at least some versions of the CAN bus protocol, these fields include (i) a one-dominant-bit start-of-frame (SOF) field at the start of the message, (ii) a message ID field, having 11 or 29 bits, that indicates the type of the message (and hence, typically, the ECU from which the message originated), (iii) a four-bit data length code ("DLC") field, which stores the length of the subsequent data field, and (iv) a data field. (Data frames may include several other fields that are not referenced below, and are therefore not mentioned here.) In at least some versions of the CAN bus protocol, each successfully-transmitted data frame ends with 8+3 consecutive recessive bits, comprising a one-recessive-bit Ack delimiter (ADel) field and a seven-recessive-bit EOF field, followed by a three-recessive-bit intermission (IS) field. Immediately following the IS field, another message may be transmitted over the bus.

While attempting to broadcast each bit in a message, the ECU also monitors the bus, to check if the attempted broadcast was successful. If the broadcast was not successful, i.e., the actual value on the bus is different from that which the ECU attempted to broadcast, the ECU identifies a "bit-error." In response, the ECU may stop broadcasting the message, and may further broadcast an error flag, and/or increment its transmit error counter (TEC). (In general, the behavior of the ECU following an unsuccessful broadcast varies, depending on several factors such as the field to which the interrupted bit belongs.) If the ECU is in a normal operating state, referred to as the "error-active state," the broadcasted error flag is an "active-error flag," which consists of six dominant bits followed by eight recessive delimiter bits.

Upon the TEC of an ECU reaching a first threshold value of 128, the ECU leaves the error-active state, and enters the "error-passive state." In this state, the ECU is not allowed to broadcast an active-error flag; instead, upon identifying an error, the ECU must broadcast a passive-error flag, which consists of six recessive bits in lieu of the six dominant bits of the active-error flag, followed by the eight-recessive-bit delimiter. (Passive-error flags are generally recessive to all other messages broadcast on the network, in that these flags include only recessive bits.) Typically, in practice, the ECU does not actually broadcast the first six recessive bits; rather, the ECU broadcasts the eight-recessive-bit delimiter following the identification, by the ECU, of six consecutive recessive bits on the bus. Other broadcasting rights of the ECU may also be restricted in the error-passive state; for example, the ECU may be required to broadcast eight recessive bits following the end of the intermission of a previous message, before gaining the right to broadcast a new message.

An ECU may have its TEC reduced by one, following each successful broadcast of a message; hence, following a sufficient number of successful broadcasts, the ECU may exit the error-passive state, and return to normal broadcasting. If, however, the TEC of the ECU reaches a second threshold value of 256, the ECU enters the "bus-off state," in which the ECU is disabled, and is not allowed to broadcast at all.

In one type of spoofing attack, an attacker obtains control of one of the ECUs, and uses this subverted ECU to impersonate another one of the ECUs, by broadcasting, over the network, impersonating messages that appear to originate from the other one of the ECUs.

The following academic articles describe attacks on CAN networks, and/or methods for defending against such attacks:

(i) Matsumoto, Tsutomu, et al., "A method of preventing unauthorized data transmission in controller area network," Vehicular Technology Conference (VTC Spring), 2012 IEEE 75th. (pp. 1-5);

(ii) Kurachi, R., et al., "CaCAN-Centralized authentication system in CAN," Proc. ESCAR 2014 Europe Conference, Hamburg, Germany, 2014;

(iii) Kurachi, R., et al., "SecGW secure gateway for in-vehicle networks," 13th Int. Conf. on Embedded Security in Cars (ESCAR 2015);

(iv) Ujiie, Yoshihiro, et al., "A method for disabling malicious CAN messages by using a CMI-ECU," No. 2016-01-0068, SAE Technical Paper, 2016;

(v) Cho, Kyong-Tak, and Shin, Kang G., "Error handling of in-vehicle networks makes them vulnerable," Proceedings of the 2016 ACM SIGSAC Conference on Computer and Communications Security, ACM, 2016.

SUMMARY OF THE INVENTION

There is provided, in accordance with some embodiments of the present invention, a system, including at least one transceiver and at least one processor. The processor is configured to identify a first impersonating message, transmitted over a Controller Area Network (CAN) bus by an attacking node connected to the bus, that appears to originate from a source other than the attacking node. The processor is further configured to transmit via the transceiver, in response to identifying the first impersonating message, a stream of messages over the bus, until a defense message belonging to the stream collides with, and trumps, a second impersonating message from the attacking node. The processor is further configured to drive the attacking node, subsequently to the defense message colliding with and trumping the second impersonating message, into an error-passive state in which an ability of the attacking node to communicate over the bus is limited relative to before entering the error-passive state, by repeatedly retransmitting the defense message over the bus in sync with retransmissions of the second impersonating message by the attacking node, such that the defense message collides with, and trumps, multiple subsequent instances of the second impersonating message.

In some embodiments, the first impersonating message appears to originate from the system.

In some embodiments,
the attacking node, in response to the defense message colliding with and trumping a final one of the instances of the second impersonating message, repeatedly transmits a passive-error flag over the bus, and
the processor is further configured to drive the attacking node into a bus-off state in which the attacking node cannot communicate over the bus, by transmitting, over the bus, a plurality of passive-error-flag-trumping messages that collide with, and trump, respective instances of the passive-error flag.

In some embodiments, the processor is configured to drive the attacking node into the error-passive state by causing an error counter of the attacking node to be increased to a first threshold, and to drive the attacking node into the bus-off state by causing the error counter of the attacking node to be further increased to a second threshold.

In some embodiments, the defense message collides with the second impersonating message by virtue of beginning during the same bit-time slot as does the second impersonating message.

In some embodiments, the defense message trumps the second impersonating message by virtue of including a dominant bit, as defined by a communication protocol used on the bus, during the same bit-time slot as a recessive bit belonging to the second impersonating message.

In some embodiments, the defense message includes the dominant bit in a data field of the defense message.

In some embodiments, the defense message includes only dominant bits in the data field.

In some embodiments, the defense message includes the dominant bit in a data length code (DLC) field of the defense message.

In some embodiments, the defense message includes only dominant bits in the DLC field.

In some embodiments, the system includes at least one electronic control unit (ECU) including the transceiver and the processor.

In some embodiments, the first impersonating message appears to originate from the source other than the attacking node by virtue of including a message ID that is associated with the source.

In some embodiments, each of the messages in the stream of defense messages includes the message ID that is included by the first impersonating message.

In some embodiments, the processor is configured to transmit the stream of messages with a minimum spacing, between successive messages of the stream, that is allowed by a communication protocol used on the bus.

There is further provided, in accordance with some embodiments of the present invention, a system including at least one transceiver and at least one processor. The processor is configured to identify a first impersonating message, transmitted over a Controller Area Network (CAN) bus by an attacking node connected to the bus, that appears to originate from a source other than the attacking node. The processor is further configured to drive the attacking node, in response to identifying the first impersonating message, into an error-passive state in which an ability of the attacking node to communicate over the bus is limited, relative to before entering the error-passive state. The processor is further configured to drive the attacking node, subsequently to driving the attacking node into the error-passive state, into a bus-off state in which the attacking node cannot communicate over the bus, by transmitting, over the bus, a plurality of passive-error-flag-trumping messages that collide with, and trump, respective instances of a passive-error flag that the attacking node transmits over the bus.

There is further provided, in accordance with some embodiments of the present invention, a method that includes identifying a first impersonating message, transmitted over a Controller Area Network (CAN) bus by an attacking node connected to the bus, that appears to originate from a source other than the attacking node. The method further includes, in response to identifying the first impersonating message, transmitting a stream of messages over the bus, until a defense message belonging to the stream collides with, and trumps, a second impersonating message from the attacking node. The method further includes, subsequently to the defense message colliding with and trumping the second impersonating message, driving the attacking node into an error-passive state in which an ability of the attacking node to communicate over the bus is limited, relative to before entering the error-passive state, by repeatedly retransmitting the defense message over the bus in sync with retransmissions of the second impersonating message by the attacking node, such that the defense message collides with, and trumps, multiple subsequent instances of the second impersonating message.

In some embodiments, the identifying is performed by a first defending node, and transmitting the passive-error-flag-trumping messages includes transmitting at least some of the passive-error-flag-trumping messages by at least one second defending node.

In some embodiments, the method further includes, using the first defending node, instructing the at least one second defending node to transmit the at least some of the passive-error-flag-trumping messages.

There is further provided, in accordance with some embodiments of the present invention, a method that includes identifying a first impersonating message, transmitted over a Controller Area Network (CAN) bus by an attacking node connected to the bus, that appears to originate from a source other than the attacking node. The method further includes, in response to identifying the first impersonating message, driving the attacking node into an error-passive state in which an ability of the attacking node to communicate over the bus is limited, relative to before entering the error-passive state. The method further includes, subsequently to driving the attacking node into the error-passive state, driving the attacking node into a bus-off state in which the attacking node cannot communicate over the bus, by transmitting, over the bus, a plurality of passive-error-flag-trumping messages that collide with, and trump, respective instances of a passive-error flag that the attacking node transmits over the bus.

The present invention will be more fully understood from the following detailed description of embodiments thereof, taken together with the drawings, in which:

DETAILED DESCRIPTION OF EMBODIMENTS

Introduction

Figure 1:
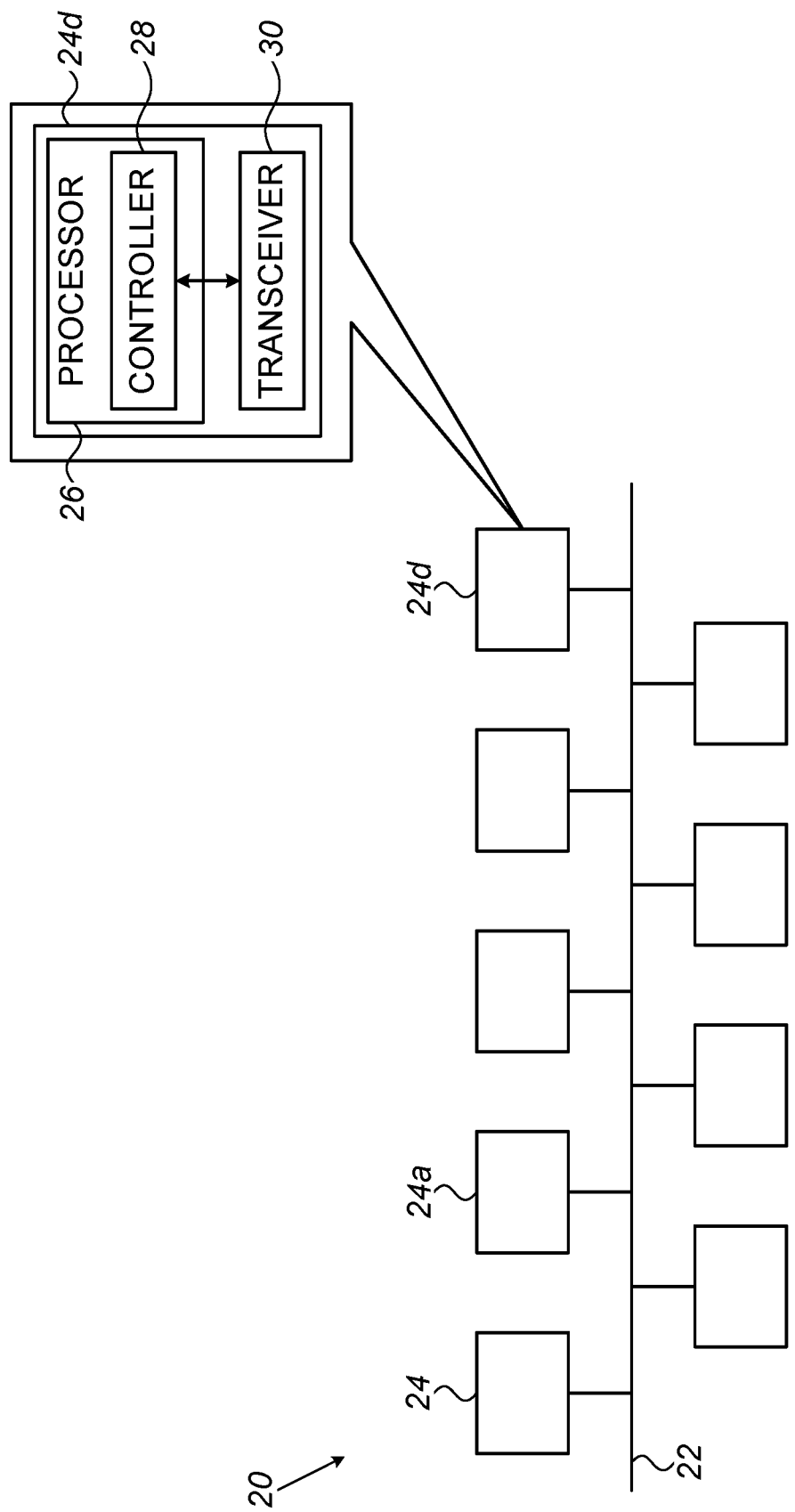
FIG. 1 is a schematic illustration of a system for defending against spoofing attacks on a CAN bus, in accordance with some embodiments of the present invention.

Although the present description may assume certain properties of the CAN bus protocol—such as the existence or ordering of particular fields, the length of a particular field, or the length and content of a particular type of message—it is noted that embodiments described herein may be applied, mutatis mutandis, to any version of the CAN bus protocol, or to any other similar protocol, having any suitable properties. Moreover, although the description below generally refers to ECUs, it is noted that embodiments described herein may be applied to defending any relevant type of bus-connected computing node from a spoofing attack. Examples of alternate types of nodes include electronic sensors (which are generally less complex than ECUs), and line replaceable units (LRUs), which control the operation of certain aircraft.

Although, as described above, the CAN bus protocol typically requires that messages be broadcast over the CAN bus, the techniques described herein may also be applied to protocols in which messages are transmitted in other ways. Hence, the term "transmitting," which includes broadcasting and all other types of transmitting, is generally used below, rather than the narrower term "broadcasting." In general, in the context of the present specification, including the claims, the term "transmit" (or "retransmit") may refer even to a partial transmission that is not successfully completed; for example, a given ECU may be said to transmit a message that is trumped by another message.

The present description generally assumes that the zero-bit is dominant, and the one-bit is recessive, such that, for example, a first signal "1101" trumps a second signal "1110" that is transmitted simultaneously with the first signal, i.e., the first signal, rather than the second signal, is transmitted over the bus. Techniques described herein may be applied to situations in which the reverse designation is used, simply by substituting zeros for ones, and ones for zeros.

Typically, the IS field is not considered to be part of any message, such that one typically refers to an intermission "between" the preceding message and the subsequent message, or to a minimum three-bit-time-slot intermission "between" two messages. In the present specification, including the claims, this convention may be used, alternatively or additionally to the alternate convention used above in the Background. Thus, for example, a given message may be said to include a three-bit intermission, or, alternatively, to be followed by a three-bit intermission.

Overview

Embodiments described herein provide systems, methods, and software for defending against spoofing attacks on a CAN bus network. Embodiments described herein generally capitalize on the fact that although an attacker may take control of the higher-level functions of an ECU (as implemented by the ECU's processor), the attacker typically cannot change the functionality of the CAN controller or transceiver of the ECU.

As noted above in the Background, in a spoofing attack, a subverted ECU (henceforth: "the attacker," or "the attacking ECU") impersonates another ECU, by sending messages that appear to originate from this other ECU. In embodiments of the present invention, this other ECU (henceforth: "the defender," or "the defending ECU") defends against the attack, by causing the attacker to become disabled while keeping the defending ECU, and other ECUs, operational. The attacker is thus prevented from causing significant harm to any other ECUs, to the vehicle, or to the occupants of the vehicle.

First, the defender identifies a message having a message ID that is associated with the defender, which was not transmitted by the defender. The defender thus identifies that the message is an impersonating (or "spoofed") message, and hence, that a spoofing attack is underway, i.e., that an attacker is in the process of transmitting one or more impersonating messages.

In response to identifying this impersonating message, the defender transmits a rapid stream (which may be alternatively referred to as a "pulse," or "batch") of defense messages, each message of which having the same message ID as the spoofed message, but having only dominant bits in the DLC or data field. It is assumed that the next impersonating message from the attacker will have the same message ID as the initial impersonating message, and that, by virtue of the synchronous nature of the CAN protocol, this next impersonating message will begin during the same bit-time slot as one of the defense messages. Hence, by transmitting this rapid stream of defense messages, the defender attempts to win a DLC-field or data-field collision with the next impersonating message.

In some embodiments, the stream of defense messages is transmitted at the maximum speed allowed by the CAN bus protocol. In other words, the spacing between successive defense messages in the stream is the minimum allowed by the CAN bus protocol, such that, for example, each of the second and subsequent defense messages immediately follows the three bit-time slot intermission of the preceding defense message. This minimum spacing increases, as much as possible, the likelihood of a collision between the defense messages and the next impersonating message.

Upon one of the defense messages in the stream colliding with an impersonating message and winning the collision, the attacker stops transmitting the impersonating message, and instead transmits an active-error flag and increments its TEC by eight, as described above in the Background. Since the active-error flag includes six consecutive dominant bits, and the defense message may not (per the bit-stuffing convention) include more than five consecutive dominant bits, the active-error flag trumps a recessive bit (such as a recessive stuffing bit in the data field that follows five consecutive dominant bits) in the defense message. Hence, the defender's TEC is also incremented by eight.

The CAN bus protocol then causes both the attacker and the defender to enter a "retransmit mode," in which these ECUs repeatedly retransmit their respective messages in sync with one another, such that a plurality of subsequent, identical collisions occur. (This effect may be described as a "snowball effect," wherein the initial collision automatically triggers a plurality of subsequent collisions.) After each of these collisions, the attacker transmits an active-error flag and increments its TEC by eight. Thus, after 15 of these subsequent collisions (and a total of 16 collisions) have occurred, the respective TECs of the attacker and the defender reach 128, such that both the attacker and the defender enter the error-passive state.

Subsequently, the attacker and defender again retransmit in sync with one another, such that a 17th collision occurs, and the TEC of the attacker is incremented to 136. Since the attacker is in the error-passive state, the attacker cannot transmit an active-error flag after this 17th collision. Hence, the defender successfully completes its transmission of the defense message, reduces its TEC by one, and leaves the retransmit mode and the error-passive state.

The attacker, on the other hand, must cease its transmission of the impersonating message, and instead transmit a passive-error flag over the bus. The defender, however, repeatedly prevents the attacker from completing this task, by continuing to transmit a rapid stream of defense messages, such that a respective defense message trumps every passive-error flag that the attacker transmits. Each failed attempt to complete the transmission of a passive-error flag results in the TEC of the attacker being incremented by eight. Thus, after 15 failed attempts to complete the transmission of the passive-error flag, the TEC of the attacker reaches 256, and the attacker is disabled, i.e., the attacker enters the bus-off state. (While the TEC of the attacker continues to increase, the TEC of the defender may continue to decrease, following each successful transmission of a defense message.)

As further described below, following the 17th collision, any of the ECUs in the network may participate in disabling the attacker. That is, since any message on the network—not only the defense messages of the defender—trump a passive-error flag, any message transmitted by any of the ECUs during a transmission of a passive-error flag by the attacker will cause the TEC of the attacker to be incremented by eight.

In some embodiments, the defense techniques described herein are implemented by the processor of the ECU, without requiring any special configuration of the CAN controller or CAN transceiver of the ECU. An advantage of such embodiments is that it may be easier to configure an off-the-shelf ECU to practice the techniques described herein, relative to if changes to the CAN controller or CAN transceiver were required. For example, it may be possible to simply install an appropriate software patch on the ECU, without changing the underlying functionality of the ECU's CAN controller. In such embodiments, the defending ECU may defend against a spoofing attack even while following the CAN bus protocol.

In other embodiments, the defense techniques described herein are implemented at least partly by the CAN controller and/or CAN transceiver of the defending ECU. An advantage of such embodiments is that the defending ECU need not necessarily follow the CAN bus protocol when defending against an attack; as a result, the defending ECU may respond faster and more efficiently to the attack. For example, the defending ECU may respond in real-time to the initial spoofed message, by transmitting one or more dominant bits that trump the initial spoofed message, before this message can do any harm. (For example, the defender may transmit successive dominant bits while the DLC field of the spoofed message is being transmitted, until one of these dominant bits overrules a recessive bit in the DLC field of the spoofed message.) Each subsequent instance of the spoofed message may be similarly trumped, using a relatively small number of dominant bits.

In general, any suitable component, or group of components, of the defending ECU may implement any of the techniques described herein, using any combination of hardware and software elements.

System Description

Reference is initially made to FIG. 1, which is a schematic illustration of a system 20 for defending against spoofing attacks on a CAN bus 22, in accordance with some embodiments of the present invention.

In some embodiments, bus 22 is installed in a terrestrial motor vehicle, such as a car, truck, or passenger bus. In such embodiments, a plurality of ECUs 24, configured to control different respective aspects of the vehicle's operation, are typically connected to bus 22. ECUs 24 may be configured to communicate over bus 22 using any version of the CAN bus protocol, such as, for example, version 2.0, or a version of CAN FD. Each ECU 24 comprises a processor 26, such as a microcontroller, and a CAN controller 28, which may also be referred to as a "processor." In some embodiments, processor 26 comprises CAN controller 28. Each ECU 24 further comprises a CAN transceiver 30. Processor 26 and CAN controller 28 transmit and receive messages over bus 22 via CAN transceiver 30. In some embodiments, one or more of ECUs 24 comprises an off-the-shelf product, comprising, for example, the Philips SJA1000 CAN controller. System 20 may further comprise one or more electronic sensors, which may be configured, similarly to ECUs 24, to perform the techniques described herein.

Alternatively to the automotive application described above, bus 22 may be installed in any other suitable type of system or device. In such embodiments, alternatively or additionally to ECUs 24, any other suitable type of computational nodes (or "computational devices") may be connected to bus 22. For example, bus 22 may be installed in an airplane, with a plurality of LRUs being connected to bus 22. Similarly to ECUs 24, any one or more of these nodes may comprise a processor, a CAN controller, and a CAN transceiver, and may be configured to practice the techniques described herein.

Processor 26 is typically a programmed digital computing device comprising a central processing unit (CPU) and a random access memory (RAM), as well as, optionally, non-volatile secondary storage, and/or peripheral devices. Program code, including software programs, and/or data, may be loaded into the RAM for execution and processing by the CPU, and results may be generated for output, as is known in the art. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

For the remainder of the present description, it will be assumed that a first ECU 24a has been subverted, and is consequently engaged in a spoofing attack, by transmitting, over bus 22, impersonating messages that appear to originate from a source other than the attacking node, such as another ECU. Hence, first ECU 24a will be referred to as the "attacking ECU," or simply as the "attacker." As described in detail below, second ECU 24d identifies this attack in progress, and, in response, defends against the attack. Hence, second ECU 24d will be referred to as the "defending ECU," or simply as the "defender."

Driving the Attacker into the Error-Passive State

Figure 2:
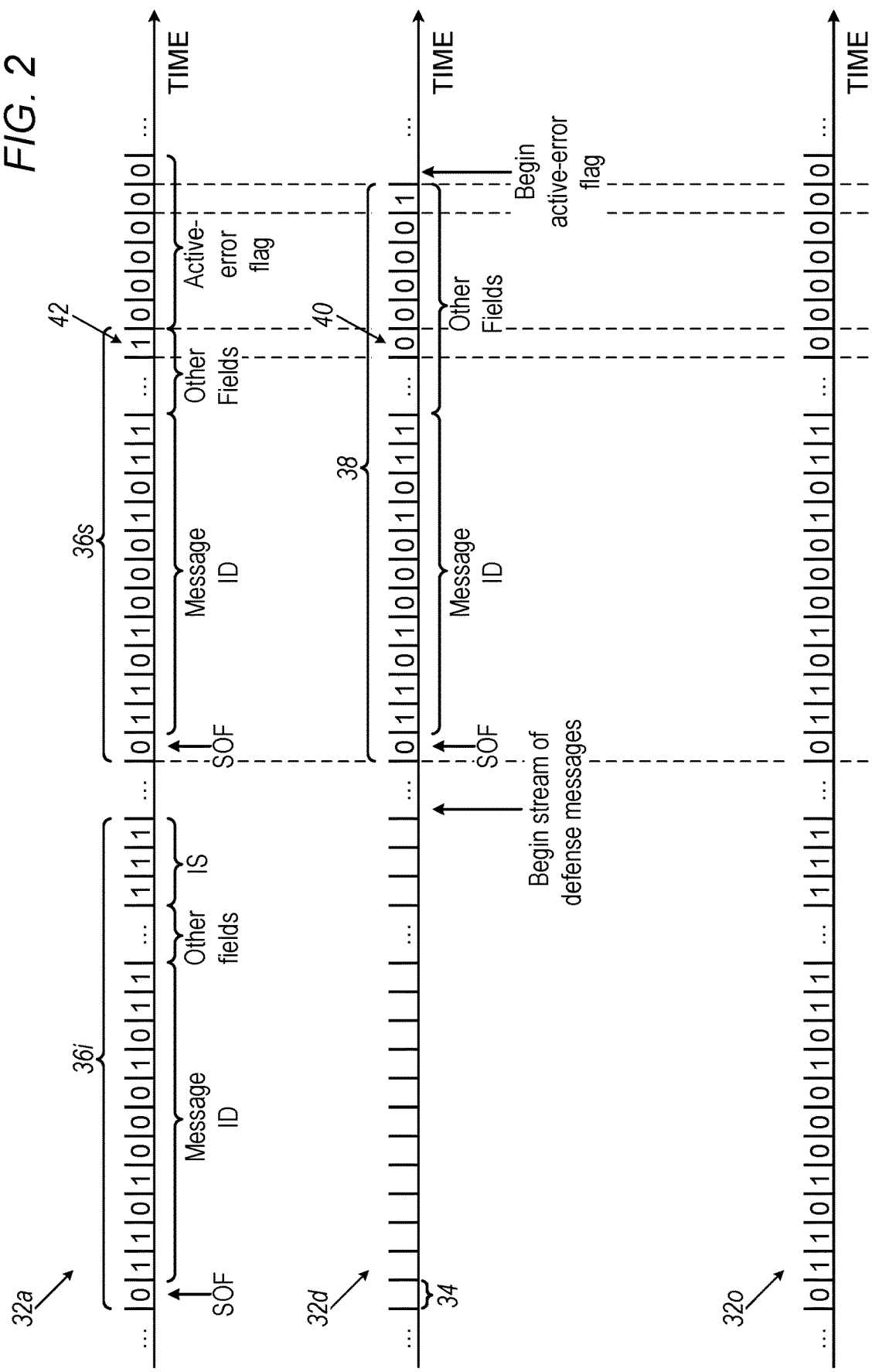
FIG. 2 is a schematic illustration of a technique for driving an attacking ECU into an error-passive state, in accordance with some embodiments of the present invention.

Reference is now made to FIG. 2, which is a schematic illustration of a technique for driving an attacking ECU into an error-passive state, in accordance with some embodiments of the present invention.

FIG. 2 shows three signals plotted against an identical time axis divided into a plurality of bit-time slots 34. These signals include a first signal 32a, which is transmitted by attacking ECU 24a, a second signal 32d, which is transmitted by defending ECU 24d, and a third signal 32o, which is observed on bus 22 by any observer, such as the attacking ECU, the defending ECU, or any other ECU connected to bus 22.

Each bit-time slot 34 has the same duration, this duration being related to the speed of CAN bus 22. (A faster bus has a smaller bit-time slot duration.) As described above in the Background, during any given bit-time slot, only a single bit value may be transmitted over the bus. In the event that two ECUs attempt to transmit conflicting bit values during the same bit-time slot, the dominant value wins. For example, a data-field collision occurs when two ECUs begin transmitting, during the same bit-time slot, respective messages that conflict with one another, in that these messages have the same message ID, but different respective data fields. In such a situation, the message having a leading dominant bit in its data field wins the collision, i.e., it trumps the other message. (Equivalently, it may be stated that the leading dominant bit in the first message trumps the identically-positioned recessive bit in the second message.)

First signal 32a begins with an impersonating message 36i. Impersonating message 36i, like other data frames sent over bus 22, includes a plurality of fields, including a start-of-frame (SOF) field, consisting of one dominant bit, a message ID field, and various other fields not shown explicitly, including a DLC field and a data field. Impersonating message 36i ends with (or, as may be alternatively stated, "is followed by") an intermission ("IS") field, consisting of three recessive bits.

Impersonating message 36i appears to originate from a source other than the attacker, such as another ECU that is not the attacking ECU, typically by virtue of including a message ID that is associated with this other source. Defending ECU 24d, however, by observing third signal 32o, identifies impersonating message 36i, i.e., the defending ECU identifies this message on the bus, and further identifies that this message is spoofed. For example, impersonating message 36i may appear to originate from the defending ECU itself, or from another ECU for which the defending ECU functions as a gateway (such that all messages from the other ECU pass through the defending ECU), such that the defending ECU may readily identify that this message is spoofed. Alternatively, the defending ECU may be notified by another ECU (e.g., the ECU from which the impersonating message appears to originate) that the message is spoofed. In any case, in response to identifying that a spoofing attack is underway, the defending ECU defends against the attack, as described in detail below.

As a first defense measure, the defending ECU transmits, over the bus, a stream of defense messages, which are typically identical to each other. Typically, the defending ECU begins streaming the defense messages as soon as possible after the end of the impersonating message; for example, the first message of the stream may begin during the bit-time slot that immediately follows the intermission at the end of impersonating message 36i. Defending ECU 24d continues to transmit this stream of defense messages, until a defense message 38 belonging to the stream begins during the same bit-time slot as a subsequent impersonating message 36s from the attacker.

Typically, each defense message includes the same message ID as does the first impersonating message. Since, typically, the subsequent impersonating messages also have this message ID, collisions between conflicting message ID fields typically do not occur. Each defense message is constructed, however, to include, in at least one field (such as the DLC or data field) following the message ID, at least one dominant bit 40 at the same position as a recessive bit 42 belonging to any subsequent impersonating message, such that defense message 38 trumps impersonating message 36s.

For example, each defense message may include only dominant bits in the DLC field and/or in the data field. Since any impersonating message from the attacker will almost certainly contain at least one recessive bit in each (or at least one of) these fields, such a defense message will almost certainly win a collision with any impersonating message. (In some embodiments, each of the ECUs is configured to ignore messages having all-dominant DLC or data fields, or at least to treat such messages as warning messages only, such that these messages do not interfere with the normal functioning of the vehicle.) Alternatively, the DLC and/or data field of each defense message may replicate that of the initial impersonating message, except for a single leading dominant bit in the defense message taking the place of a recessive bit in the impersonating message. (This latter technique assumes that at least the first subsequent impersonating message will share the same DLC and/or data field value as the initial impersonating message.)

Typically, the spacing between successive messages of the stream is as small as possible, such as to maximize the likelihood of a collision with an impersonating message. For example, the spacing may be the minimum spacing allowed by the CAN bus protocol, such that each of the second and subsequent defense messages in the stream immediately follows the intermission at the end of the previous defense message. As long as the CAN controller of the attacking ECU has not been compromised, the attacking ECU must follow the CAN bus protocol; hence, given this minimum-allowable spacing between defense messages, the attacking ECU is forced to either transmit in sync with a defense message—in which case the defense message will win the resulting collision—or cease transmission.

Notwithstanding the above, it is noted that successive messages in the stream of defense messages need not necessarily have the minimum-allowable spacing. Without the minimum-allowable spacing, it is possible that some subsequent impersonating messages from the attacker will be transmitted successfully. Nevertheless, as long as the spacing between successive defense messages is not too large, it is likely that the attacker will eventually transmit in sync with a defense message. In other words, even if the defender doesn't succeed in trumping the second impersonating message from the attacker, the defender will nonetheless trump the third, fourth, or a subsequent impersonating message.

(Relatedly, it is noted that the terms "first" and "second" may be used in the present claims to differentiate two impersonating messages from one another, without requiring that these two messages be the actual first and second impersonating messages transmitted by the attacker. In other words, although the defender typically identifies the first impersonating message from the attacker, it is possible, in some cases, that this first message will be missed; hence, in the context of the present claims, the "first" impersonating message, which is identified by the defender, is not necessarily the first impersonating message transmitted by the attacker. Likewise, as described in the previous paragraph, the "second" impersonating message, which is trumped by the defender, is not necessarily the second impersonating message transmitted by the attacker.)

It is noted that even with transmission by the defender at the minimum-allowable spacing, it is possible that other, non-related messages will be carried on the bus between the defense messages. For example, another message may have a higher priority than the defense messages, such that the message ID of this other message trumps the message ID of one of the defense messages.

In some embodiments, the defender continues to transmit the stream of defense messages until one of the defense messages collides with an impersonating message from the attacker. In other embodiments, the length of the stream is set in accordance with the minimum tolerable frequency of impersonating messages. In other words, the duration of the stream may be set to the maximum interval between impersonating messages for which the impersonating messages are deemed to be potentially harmful.

In alternate embodiments, instead of flooding the bus with a stream (or multiple streams) of defense messages, the defender predicts the time at which the next spoofed message will be transmitted, and times the transmission of defense message 38 to coincide with this predicted time. For example, the defender may identify, from the message ID of the initial spoofed message, that this message is of the type that is sent with a period of X bit-time slots. The defender may therefore begin defense message 38 at X bit-time slots from the beginning of the initial spoofed message.

Upon defense message 38 colliding with, and trumping, impersonating message 36s, the attacking ECU identifies (by observing third signal 32o) that the transmission of recessive bit was not successful. The CAN controller of the attacker therefore stops transmitting impersonating message 36s, and instead increases its TEC by eight, and transmits an active-error flag. Since the active-error flag includes six consecutive dominant bits, and defense message 38, by virtue of the bit-stuffing convention, cannot include more than six consecutive dominant bits, the active-error flag trumps a recessive bit in defense message 38. (For example, the last bit in the attacker's active-error flag may trump a stuffing bit in defense message 38.) As a result, the defender ceases transmission of defense message 38, increases its TEC by eight, and transmits its own active-error flag.

Following the active-error flag of the defender, per the CAN bus protocol, since both the attacker and the defender failed to successfully transmit their respective messages, the attacker and defender, in sync, repeatedly reattempt a successful transmission. In other words, the defender repeatedly retransmits defense message 38 in sync with retransmissions of impersonating message 36s by the attacking ECU. As a result, defense message 38 collides with, and trumps, multiple subsequent instances of impersonating message 36s. After each of these collisions, the same sequence of events described above, with regards to the first collision, occur. Hence, after 15 retransmissions—and thus a total of 16 collisions—the TEC of the attacker reaches the first threshold of 128, such that the attacker is driven into the error-passive state, in which the ability of the attacker to communicate over the bus is limited, relative to before entering the error-passive state. (The defender also increments its TEC and enters the error-passive state; however, as described below with reference to FIG. 3, the defender subsequently decreases its TEC, whereas the attacker's TEC is further increased.)

In some embodiments, processor 26 is configured to drive the attacking ECU into the error-passive state by transmitting a stream of defense messages as described above, without requiring any special configuration of the CAN controller. Typically, the processor performs this function by executing software or firmware code; it is noted, however, that this functionality may alternatively or additionally be implemented in hardware, e.g., using one or more Application-Specific Integrated Circuits (ASICs) or Field-Programmable Gate Arrays (FPGAs).

In other embodiments, CAN controller 28 or CAN transceiver 30 is configured to drive the attacking ECU into the error-passive state. For example, the CAN controller of an off-the-shelf ECU may be appropriately reconfigured to perform the techniques described herein, or this CAN controller may be replaced with an alternate, appropriately-configured CAN controller. The relevant functionality of CAN controller 28 is typically implemented in hardware, e.g., using one or more ASICs or FPGAs; it is noted, however, that this functionality may, alternatively or additionally, be implemented in firmware or software.

In some of these other embodiments, CAN controller 28 is configured to drive the attacking ECU into the error-passive state by transmitting a stream of defense messages as described above. Alternatively, the CAN controller may be configured to drive the attacking ECU into the error-passive state even without transmitting full, CAN-bus-protocol-compliant data frames. For example, the CAN controller, immediately upon observing the spoofed message ID in first impersonating message 36i, may begin transmitting dominant bits, such that one of these bits collides with, and trumps, a recessive bit belonging to the first impersonating message. Alternatively, the CAN controller may predict, e.g., based on knowledge of the bus protocol and/or based on observing previous transmissions, when the next recessive bit will occur, and then trump this bit with a single dominant bit. Subsequently, the CAN controller may passively wait for the transmission of each of the 15 subsequent impersonating messages, and trump each of these subsequent messages as described above for first impersonating message 36i, such that the attacker enters the error-passive state. (Using this technique, the defender is not forced to increase its own TEC.)

Driving the Attacker into the Bus-Off State

Figure 3:
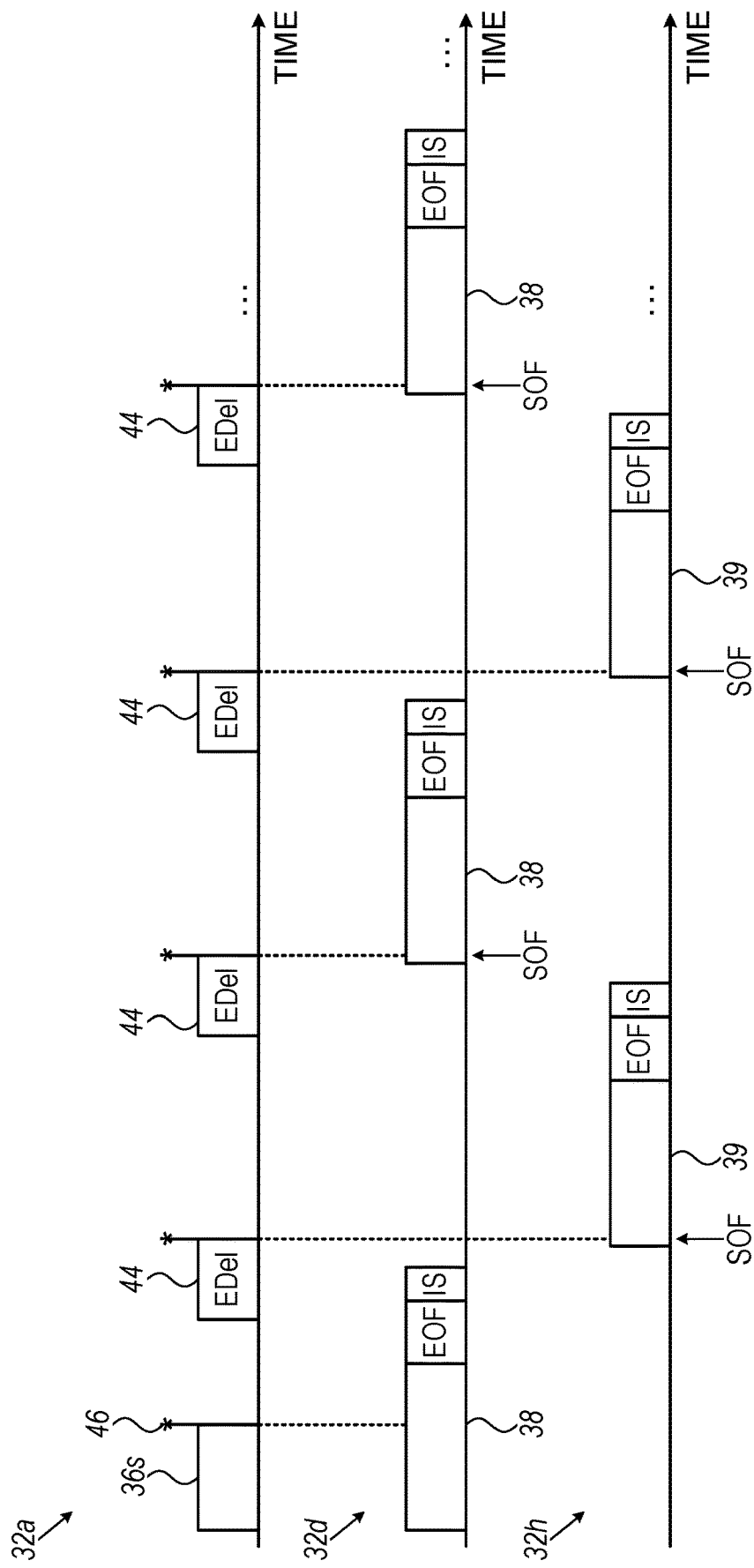
FIG. 3 is a schematic illustration of a technique for driving an attacking ECU into a bus-off state, in accordance with some embodiments of the present invention.

Reference is now made to FIG. 3, which is a schematic illustration of a technique for driving an attacking ECU into a bus-off state, in accordance with some embodiments of the present invention.

FIG. 3 depicts the second stage in defending against the spoofing attack waged by the attacking ECU, following the driving of the attacking ECU into the error-passive state. Similarly to FIG. 2, FIG. 3 shows first signal 32a, which is transmitted by the attacker, and second signal 32d, which is transmitted by the defender, plotted against a common time axis. (In FIG. 3, for simplicity, the bit-time slots are not explicitly shown.) FIG. 3 further shows another signal 32h, which represents the transmission of another "helper" ECU that is connected to bus 22.

The portion of first signal 32a shown in FIG. 3 begins with the final retransmission of impersonating message 36s by the attacker. (This retransmission is the 16th retransmission, i.e., the 17th transmission, of this message.) The defender again transmits defense message 38 in sync with the attacker, such that the attacking ECU loses yet another collision (as indicated by a collision-losing indicator 46), and increases its TEC by another increment of eight (for a total of 136). This time, however, given that the attacker is in the error-passive state, the attacker may not transmit an active-error flag; rather, the attacker is required to transmit a passive-error flag. As described above in the Background, transmission of a passive-error flag is performed, in practice, by observing six consecutive recessive bits on the bus, and then transmitting an eight-recessive-bit delimiter. Hence, the attacker typically must wait until observing the single-recessive-bit Ack delimiter of defense message 38, followed by the first five bits of the seven-recessive-bit EOF of defense message 38, before beginning to transmit an error delimiter (EDel) 44.

Since error delimiter 44 includes only recessive bits, the defender completes the transmission of defense message 38, such that the defender's TEC is reduced by one, and the defender leaves the error-passive state. The last bit of the intermission (IS) of defense message 38 coincides with (i.e., is transmitted during the same bit-time slot as) the fifth bit of error delimiter 44.

Following the intermission, the attacker requires another three bit-time slots to complete the transmission of the error delimiter. The defender, however, may prevent the attacker from completing this transmission, by transmitting another defense message 38, or any other suitable message, before these three bit-time slots have transpired. This message may be referred to as a "passive-error-flag-trumping message," in that this message trumps the error message of the attacker. Since, typically, all messages begin with a dominant SOF bit, any message, having any arbitrary content, may suitably function as a passive-error-flag-trumping message.

Alternatively, as depicted in FIG. 3, a helper ECU may transmit its own passive-error-flag-trumping message 39, which may typically have any arbitrary content. In any case, regardless of the transmitter of the next-transmitted message, the first dominant bit (such as the SOF bit) of this message collides with, and trumps, one of the last three bits of the error delimiter, such that the transmission of the error delimiter fails, and the attacker's TEC is increased by another eight.

Subsequently, the attacker repeatedly retransmits the passive error flag, but the defender, and/or one or more helper ECUs, trump each instance of this flag, by transmitting a stream of successive messages having an inter-message spacing of idle bus time that is less than three bit-time slots (or an inter-message spacing of less than six bit-time slots, if considering the intermission as part of the inter-message spacing). After 15 failed transmissions of the passive error flag, the attacker's TEC reaches the second threshold of 256, such that the attacker is driven into the bus-off state, in which the attacking ECU cannot communicate over the bus. In the meantime, following each successful transmission by the defender, the defender's TEC is decreased by one.

In some embodiments, a first ECU is configured to behave as a helper ECU for at least one specific second ECU. Upon the second ECU responding to a spoofing attack by transmitting a stream of defense messages, the first ECU identifies each of the first 16 collisions caused by this response, by observing, on the bus, a message ID associated with the second ECU, followed by the one or more active-error flags generated from the collision.

Subsequently, the first ECU may begin transmitting, at a relatively rapid rate, passive-error-flag-trumping messages. Alternatively or additionally, the defender may actively instruct one or more other ECUs to help the defender drive the attacker into the bus-off state by transmitting passive-error-flag-trumping messages. In any case, the passive-error-flag-trumping messages from the helper ECUs may be particularly advantageous in the event that the defender is unable to, alone, maintain the required spacing between successive defense messages. For example, as depicted in FIG. 3, the defender and an assisting ECU may alternatingly transmit over the bus, such that fewer than three bit-time slots (or six bit-time slots, including the intermission) separate between each pair of successive passive-error-flag-trumping messages.

Alternatively or additionally, the defender may be assisted by any normal traffic over the bus (i.e., any transmitted messages that are due to the normal functioning of the ECUs), since even such normal traffic inhibits the attacker from completing the transmission of a passive-error flag.

Pseudocode

In some embodiments, an ECU may be configured to perform the defense techniques described herein by running any suitable implementation (in software, firmware, or hardware) of the following pseudocode. (In the pseudocode below, the symbol "//" introduces a comment.)

```
procedure MAIN( )
    InitializeDefenseSystem( )
    while parrotOnGuard do
        if suspectFound then
            // identified a spoofed message with my ID
            ENGAGE(spoofedID)
procedure ENGAGE(spoofedID)
    // continue until we either intercept a spoofed message
    or give up
    while suspectFound and !collisionDetected do
        transmitNDmessages(ND)
procedure transmitNDmessages(ND)
    bound = ND
    for (i=0; i < bound; i++) do
        transmitDmessage( )  // transmit a defense message
        // After identifying a potential collision we enter
        the final stage of our counter-attack, and reset
        the flags to allow new suspect identification.
        if collisionDetected then
            collisionDetected=False
            suspectFound=False
            bound=i+16        // transmit exactly 15 more
```

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   at least one transceiver; and
   at least one processor, configured:
      to identify an impersonating message, transmitted over a Controller Area Network (CAN) bus by an attacking node connected to the bus, that appears to originate from a source other than the attacking node,
      to drive the attacking node, in response to identifying the impersonating message, into an error-passive state in which an ability of the attacking node to communicate over the bus is limited, relative to before entering the error-passive state, and
      to drive the attacking node, subsequently to driving the attacking node into the error-passive state, into a bus-off state in which the attacking node cannot communicate over the bus, by transmitting via the transceiver, over the bus, a plurality of passive-error-flag-trumping messages that collide with, and trump, respective instances of a passive-error flag transmitted by the attacking node over the bus.

2. The system according to claim 1,
   wherein the instances of the passive-error flag include respective error delimiters, and
   wherein the processor is configured to transmit the passive-error-flag-trumping messages such that respective dominant start-of-frame (SOF) bits belonging to the passive-error-flag-trumping messages trump respective recessive bits belonging to the error delimiters.

3. The system according to claim 2, wherein the processor is configured to transmit the passive-error-flag-trumping messages such that fewer than three bit-time slots separate each pair of successive passive-error-flag-trumping messages from one another.

4. The system according to claim 1, wherein the processor is configured to drive the attacking node into the error-passive state by causing an error counter of the attacking node to be increased to a first threshold, and to drive the attacking node into the bus-off state by causing the error counter of the attacking node to be further increased to a second threshold.

5. The system according to claim 1, wherein the at least one processor comprises:
   a first processor, configured to drive the attacking node into the error-passive state; and
   a second processor, configured to transmit at least some of the passive-error-flag-trumping messages.

6. The system according to claim 5, wherein the first processor is further configured to instruct the second processor to transmit the at least some of the passive-error-flag-trumping messages.

7. The system according to claim 5, wherein the first processor and the second processor are configured to alternatingly transmit the passive-error-flag-trumping messages.

8. A method, comprising:
   identifying an impersonating message, transmitted over a Controller Area Network (CAN) bus by an attacking node connected to the bus, that appears to originate from a source other than the attacking node;
   in response to identifying the impersonating message, driving the attacking node into an error-passive state in which an ability of the attacking node to communicate over the bus is limited, relative to before entering the error-passive state; and
   subsequently to driving the attacking node into the error-passive state, driving the attacking node into a bus-off state in which the attacking node cannot communicate over the bus, by transmitting, over the bus, a plurality of passive-error-flag-trumping messages that collide with, and trump, respective instances of a passive-error flag transmitted by the attacking node over the bus.

9. The method according to claim 8,
   wherein the instances of the passive-error flag include respective error delimiters, and
   wherein transmitting the passive-error-flag-trumping messages comprises transmitting the passive-error-flag-trumping messages such that respective dominant start-of-frame (SOF) bits belonging to the passive-error-flag-trumping messages trump respective recessive bits belonging to the error delimiters.

10. The method according to claim 9, wherein transmitting the passive-error-flag-trumping messages comprises transmitting the passive-error-flag-trumping messages such that fewer than three bit-time slots separate each pair of successive passive-error-flag-trumping messages from one another.

11. The method according to claim 8, wherein driving the attacking node into the error-passive state comprises driving the attacking node into the error-passive state by causing an error counter of the attacking node to be increased to a first threshold, and wherein driving the attacking node into the bus-off state comprises driving the attacking node into the bus-off state by causing the error counter of the attacking node to be further increased to a second threshold.

12. The method according to claim 8, wherein driving the attacking node into the error-passive state comprises driving the attacking node into the error-passive state using a first defending node, and wherein transmitting the passive-error-flag-trumping messages comprises transmitting at least some of the passive-error-flag-trumping messages by a second defending node.

13. The method according to claim 12, further comprising, using the first defending node, instructing the second defending node to transmit the at least some of the passive-error-flag-trumping messages.

14. The method according to claim 12, wherein transmitting the passive-error-flag-trumping messages comprises alternatingly transmitting the passive-error-flag-trumping messages by the first defending node and the second defending node.

15. A computer software product comprising a tangible non-transitory computer-readable medium in which program instructions are stored, which instructions, when read by at least one processor, cause the processor:
- to identify an impersonating message, transmitted over a Controller Area Network (CAN) bus by an attacking node connected to the bus, that appears to originate from a source other than the attacking node,
- to drive the attacking node, in response to identifying the impersonating message, into an error-passive state in which an ability of the attacking node to communicate over the bus is limited, relative to before entering the error-passive state, and
- to drive the attacking node, subsequently to driving the attacking node into the error-passive state, into a bus-off state in which the attacking node cannot communicate over the bus, by transmitting, over the bus, a plurality of passive-error-flag-trumping messages that collide with, and trump, respective instances of a passive-error flag transmitted by the attacking node over the bus.

16. The computer software product according to claim 15, wherein the instances of the passive-error flag include respective error delimiters, and
wherein the instructions cause the processor to transmit the passive-error-flag-trumping messages such that respective dominant start-of-frame (SOF) bits belonging to the passive-error-flag-trumping messages trump respective recessive bits belonging to the error delimiters.

17. The computer software product according to claim 16, wherein the instructions cause the processor to transmit the passive-error-flag-trumping messages such that fewer than three bit-time slots separate each pair of successive passive-error-flag-trumping messages from one another.

18. The computer software product according to claim 15, wherein the instructions cause the processor to drive the attacking node into the error-passive state by causing an error counter of the attacking node to be increased to a first threshold, and to drive the attacking node into the bus-off state by causing the error counter of the attacking node to be further increased to a second threshold.

19. The computer software product according to claim 15,
wherein the at least one processor includes a first processor and a second processor,
wherein the instructions cause the first processor to drive the attacking node into the error-passive state, and
wherein the instructions cause the second processor to transmit at least some of the passive-error-flag-trumping messages.

20. The computer software product according to claim 19, wherein the instructions further cause the first processor to instruct the second processor to transmit the at least some of the passive-error-flag-trumping messages.

* * * * *